April 23, 1968     T. A. PAONESSA     3,380,046
WARNING SYSTEM AND SWITCHES THEREFOR
Filed Aug. 23, 1965
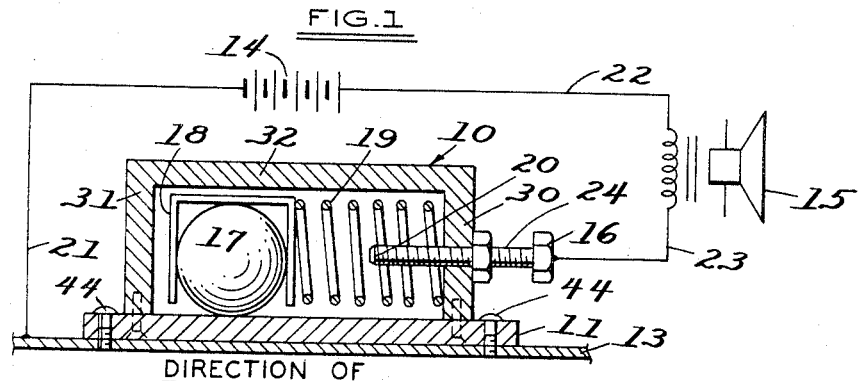
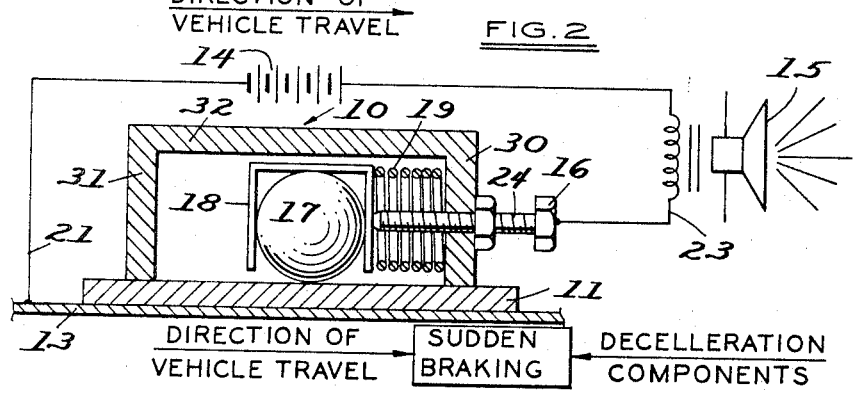
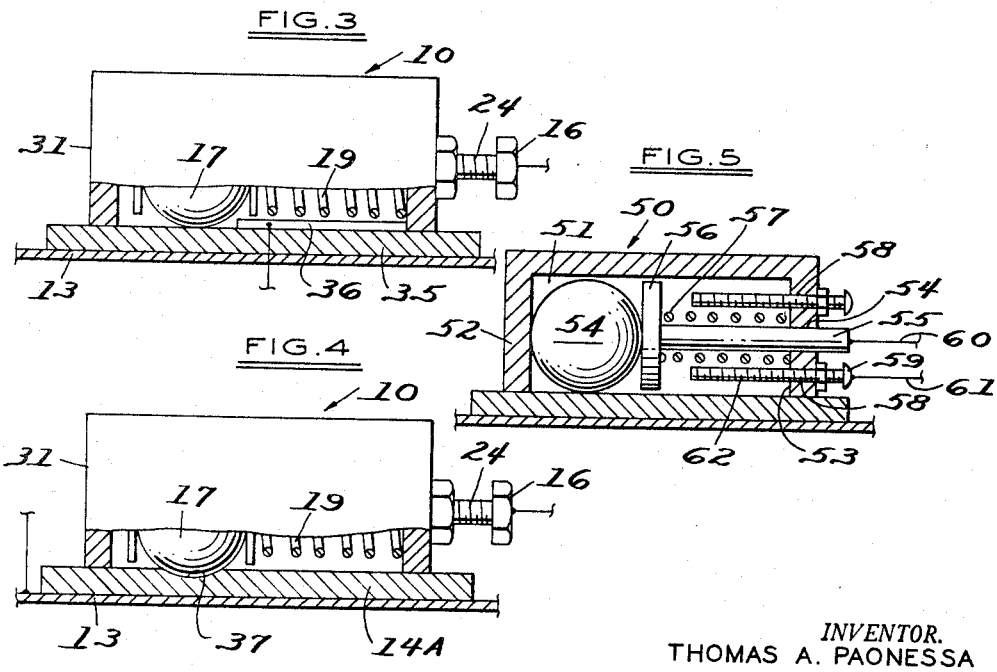
INVENTOR.
THOMAS A. PAONESSA
BY *William P. Serald*
ATTORNEY

United States Patent Office 3,380,046
Patented Apr. 23, 1968

3,380,046
WARNING SYSTEM AND SWITCHES THEREFOR
Thomas A. Paonessa, 18065 Albion Ave.,
Detroit, Mich. 48234
Filed Aug. 23, 1965, Ser. No. 481,808
5 Claims. (Cl. 340—262)

This invention relates to a vehicle deceleration warning systems and to novel inertia actuated switches particularly suitable for the warning systems.

Various types of deceleration warning systems and devices have been tried to produce a signal or warning to vehicles behind the vehicle so equipped. However, the several devices have not been proven entirely satisfactory inasmuch as they are complicated in design and construction, expensive for the manufacture, difficult to mount and install, and not positive in operation and use.

With the foregoing in view, the primary object in the invention is to provide an inertia actuated switch and warning system to provide a signal to indicate sudden deceleration which is simple in design and construction, inexpensive to manufacture, positive to use, and simple and inexpensive to install.

Another object of the invention is to provide an inertia actuated switch having an axis alignable with the axis of the vehicle and having a relatively heavy metal ball surrounded by a cage so that the cage moves with the ball.

Another object of the invention is to provide a spring in the switch case lying between the forward end of the case and the cage so that the cage and ball are normally positioned adjacent the rear end of the case and remote to the forward end of the case to have the switch normally open.

Another object of the invention is to provide an inertia actuated switch having an axis alignable with the axis of the vehicle and having a relatively heavy ball and plunger both movable in the same direction to either close or open the switch so that the ball and plunger move together.

Another object of the invention is to provide a spring in the switch case lying between the plunger and the forward end of the case so that the plunger and ball are normally positioned adjacent the rear end of the case and remote from the front end of the case to have the switch normally open.

An object of the invention is to provide a contact terminal adjacent at the forward end of the case so that when the ball and plunger or the ball and cage compress the spring under deceleration forces that the cage or plunger will make contact with the contact terminal and close the switch.

An object of the invention is to provide a metal base plate upon which the ball rolls so that electrical contact is provided between the base plate and the cage through the ball for completing the circuit to the contact terminal.

An object of the invention is to provide a step in the case over which the ball must first move before it compresses the spring so that the ball is normally positioned adjacent the rear end of the case away from the contact terminal thereby locating the ball and cage or plunger out of contact with the terminal.

An object of the invention is to provide a depression or socket in case bottom wall in which the ball may rest at a point remote from the contact terminal to position the ball remote from the terminal.

These and other objects of the invention will become apparent by reference to the following description of a deceleration warning system and the novel inertia operated switches embodying the invention taken in connection with the accompanying drawing in which:

FIG. 1 is a longitudinal cross section view of a switch device, including the warning system diagrammatically, showing the switch device attached to a metal panel of the vehicle, and showing the switch in the unactuated normally open position.

FIG. 2 is a view somewhat similar to FIG. 1 showing the switch in the actuated position closing the switch and the electrical circuit and activating the warning device.

FIG. 3 is a view similar to FIG. 1 showing a modification wherein a metal base plate is employed in the switch case constituting a step for the ball to move over.

FIG. 4 is a view similar to FIG. 3 showing a socket for the ball formed in the case wall to hold the switch in the normal off position until sufficient inertia forces are built up to cause the ball to move out of the socket; and FIG. 5 is a view similar to FIG. 1 showing a ball and plunger actuated switch.

Referring now to the drawing wherein like numerals refer to like corresponding parts throughout the several views, the novel switches and deceleration warning system disclosed therein to illustrate the invention comprises a normally open inertia actuated switch having a case 10, FIGS. 1–4 and a case 50 FIG. 5.

The switch case 10 has a metal base plate 11. The base plate 11 is electrically attached to a vehicle panel 13 by screws 44. The panel 13 is connected to one side of a source of electrical energy such as the battery 14. The other side of the battery 14 is connected to a warning device such as the horn 15 and a terminal contact 16 on the switch case 10. A relatively heavy ball 17 lies in contact with the metal base plate 11. The metal cage 18 fits over the ball 17. The ball 17 is adapted to roll in the cage 18. The cage 18 is adapted to move with the ball 17. A spring 19 is located between the forward end of the case 10 and the cage 18. The spring 19 normally positions the cage 18 and ball 17 at a point remote from the internal contact end 20 of the contact terminal 16. It can now be seen that electrical energy from the battery 14 communicates through the line 21 to the metal panel 13, base plate 11, ball 17, and cage 18. The other side of the electrical circuit from the battery 14 communicates through the line 22 to the horn 15, a line 23, terminal 16, and the internal contact end 20 of the terminal. The space between the cage 18 and the contact end 20 of the terminal 16 breaks the electrical circuit and the spring 19 normally holds the switch open.

The terminal 16 has a threaded shank 24. By turning the terminal 16 in the case 10, the internal extension of the contact end 20 may be variously adjusted within the switch case 10. The case 10 has end walls 30 and 31 and interconnecting walls 32. The case may be of any shape and in the embodiment shown, the case is shaped rectangularly. However, the case may be cylindrical or any shape within the concept of the invention.

FIG. 3 shows a modification of the device seen in FIGS. 1 and 2. In the device of FIG. 3 the bottom wall 35 may be made of the same material as the case 10. A metal base plate 36 is superposed on the bottom wall 35 constitutes a step relative to the ball 17. In other words, before the ball 17 can move toward the terminal 16, it must move up the step formed by the metal base plate 36. The device of FIG. 4 shows a further modification in that the bottom wall 14 has a depression or socket 37 in which the ball 17 seats itself through gravity. This step also constitutes a step over which the ball 17 must move before it can move towards the terminal 16 under inertia forces.

The switch device has horizontal axis along which the terminal 16 is disposed. This horizontal axis lies between the ends 30 and 31 of the switch case 10. The horizontal axis of the switch case 10 is aligned parallel with the axis of the vehicle upon which the device is mounted. The end wall 30 is positioned forwardly in the vehicle and the end wall 31 is positioned rearwardly in the vehicle. Thus the ball 17 in the open position of the switch lies adjacent the rear wall 31. Under this condition of acceleration inertia forces the ball 17 to move towards the rear wall 31. Under constant speed conditions the ball 17 remains substantially at rest at a position adjacent the rear wall 31.

However, upon deceleration of the vehicle, inertia forces tend to move the ball 17 forwardly along the case 10 axis toward the terminal 16. Under the deceleration inertia forces the ball 17 tends to move towards the contact end 20 of the terminal 16. Upon inertia forces under decelerating conditions building up to a predetermined degree, such as by sudden hard braking, the inertia forces are sufficient to move the ball 17 and cage 18 against the spring 19 with sufficient force to compress the spring 19 and move the cage 18 into electrical contact with the contact end 20 of the terminal 16. This condition is shown in FIG. 2. Upon this condition being effected, the switch closes the circuit and the warning device 15 is activated. While this warning device is shown as a horn or speaker, it is obvious that a warning light may be substituted or added in the circuit within the concept of the invention. After the deceleration forces have dissipated, the spring 18 moves the ball 17 and cage 18 to a position adjacent the rear end 31 of the case breaking the contact in the switch and deactivating the warning device.

The modifications of FIGS. 3 and 4 are useful in that the ball 17 in the embodiment of FIG. 3 must move over the step formed by the metal base plate 36 before electrical contact is made between the ball and the base plate 36. With the base plate 36 forming a step, the ball 17 must have sufficient inertia force to move up the step before it exerts force in the spring 19. In the device of FIG. 4, the socket 37 provides a seat for the ball 17 and sufficient inertia force must be developed before the ball 17 will move over the step formed by the socket 37.

The strength of the spring 19 and the degree of projection of the contact end 20 of the contact terminal 16 may be adjusted relative to one another to provide any warning conditions desired. In other words, the contact 16 may be adjustably screwed to project any desired distance into the case. The farther the contact end 20 projects into the case the less the spring 19 must be compressed before the switch closes. Conversely, the less the contact end 20 projects into the case 10, the more the spring 19 must be compressed before the switch closes to activate the warning device 15. Thus the switch may be easily adjusted to provide a warning for normal braking conditions or for abnormal braking conditions as desired.

It is to be noted that the switch construction and operation substantially foolproof in that the spring may drop to the bottom of the case or move a relative amount relative to the contact terminal 16 without coming into contact with the terminal 16. In other words, the spring 19 surrounds the contact terminal 16 without possibility of it making an electrical contact therewith. This is considered especially advantageous in that it insures that no short circuit can occur between the spring 19 and the contact terminal 16.

It is also considered very advantageous that the ball 17 does not contact the spring 19. Thus there is no roll up or winding interference between the ball 17 and the spring 19 due to the fact that the cage 18 is disposed between them. Thus the ball 17 may roll with only point contact relative to the cage 18 and with absolutely no wind up or entangling engagement with the spring 19. It is also considered very advantageous that the spring 19 presses flat against the cage 18 so that the strength and the resistance of the spring may be utilized without complications. Also the weight of the ball 17 may be utilized without complications due to the fact that its point contact with the cage 18 permits a free rolling contact for the ball and the free travel of the cage 18 with the ball 17. In connection is also to be noted that it is advantageous that the cage 18 has a sliding contact with the case 10 and that no binding or cocking can occur between the cage 18 and the case 10.

It is also advantageous that the ball 17 does not move out of contact with the base plate 11 or the base strip 36 in that neither the cage nor the spring produces lifting action on the ball so that the ball remains in electrical contact with the base plate 11 or the base strip 36. It is also to be noted that the ball stays in good electrical contact with the cage 18 and that the ball must force the cage 18 against the contact end 26 of the terminal 16. Thus good electrical contact is insured between the base plate 11 or base strip 36 and the ball 17. Under the conditions of FIG. 2 it is also insured that good electrical contact exists between the cage 18 and the contact end 20 of terminal 16.

Conversely it is also assured that there is no electrical contact between the terminal 16 and any other part conducting electricity except under the conditions illustrated in FIG. 2.

Referring now to the switch device modification shown in FIG. 5, the case 50 has an internal chamber 51, a rear end 52, and a front end 53. A ball 54 lies in the chamber 51 of the case 50 adjacent the rear end 52. The front end 53 of the case 50 has a slide aperture 54 in which a plunger 55 is slidably located. The plunger has a head 56 adjacent the ball 54. A spring 57 lies between the forward end 53 of the case 50 and the head 56 on the plunger 55. The spring normally urges the plunger 55, head 56, and ball 54 toward the rear end 52 of the case 50. The forward end 53 of the case 50 also has at least one threaded aperture 58. A contact terminal 59 is threaded in each aperture 58. The plunger 55 may be grounded or connected in a circuit by a wire 60. The contact terminal 59 may be connected in a circuit by a wire 61. The space between the head 56 of the plunger 55 and the inner end 62 of the contact terminal 59 opens the switch. The contact terminal 59 threaded engagement with the case end 53 provides for the desired adjustment of the inward extension of the contact end 62 relative to the position of the plunger head 56 and the strength of the spring 57.

In operation, the case 50, FIG. 5, is positioned in a vehicle with the front end 53 of the case 50 facing forwardly in the vehicle. The case 50 is secured to the vehicle by suitable means. One wire 60 of a circuit including a warning device, such as the horn or speaker 15 and/or a lamp is connected to the plunger 55 and head 56 which are electrically conductive, the plunger 55 and head 56 constitute one pole of the switch. Another wire 61 of the circuit is connected to the terminal 59 which is electrically conductive and constitutes the other pole of the switch. The spring 57 holds the head 56 spaced away from the contact end 62 of the terminal 59 holding the switch normally open. Upon sudden deceleration of the vehicle to which the switch is attached, the kinetic energy of the ball 54 and plunger 55 moves the head 56 of the plunger 55 against the contact end 62 of the contact pole 59 closing the switch and activating the warning device or devices in the circuit. The adjustability of the contact 59 through its threaded engagement with the case allows the user to locate the contact end 62 close to or remote from the head 56. This provides for adjusting the switch for closing under various conditions of deceleration. For example, by locating the contact end 62 adjacent to the head 56, the switch is adapted to close with relatively slight deceleration; by locating the contact end 62 remote to the head 56, the switch is adapted to close with relatively great deceleration.

The novel switch and warning system with features described constitutes a compact, durable, inexpensive, neat appearing mechanism easily operated and installed and it can be manufactured extremely inexpensively.

Although but a single embodiment of the move switch and warning system have been shown and described in detail, it is obvious that many changes will be made in the size, shape, detail, and arrangement of the various elements in the invention within the scope of the appended claims.

For example, the case can be made cylindrical, the bottom plate 11 may be formed arcuate, and the case 10 may be made hemispherical and superposed on a flat base plate 11.

I claim:

1. A vehicle deceleration warning system comprising a warning device, an electrical circuit including said warning device, and a normally open switch in said circuit which closes upon deceleration of the vehicle to energize said warning device; said switch comprising
   a case having a horizontal axis;
   said case being made of electrically non-conductive material;
   said case having opposite first and second ends, intermediate side walls, and a top wall defining an internal chamber;
   a metal electrically conductive bottom plate on said case connected in one side of said circuit;
   a metal ball in said case chamber in electrical contact with said metal plate;
   a metal cage over said metal ball in electrical contact with said ball;
   a spring lying between said cage and a first end wall of said case normally locating said cage and ball at the second end of said case chamber;
   a terminal connected to the other side of said circuit extending through said case first end wall internally of and out of contact with said spring;
   said case axis being aligned with the vehicle axis with said first wall and terminal facing forwardly in the vehicle;
   said ball and cage upon deceleration of the vehicle compressing said spring to contact said terminal thereby closing the circuit to energize said warning device.

2. An inertia actuated normally open switch movable to a closed position by deceleration forces, comprising
   an electrically non-conductive case having front and rear end walls and interconnecting walls defining an internal chamber;
   said case having a longitudinal axis lying between said front and rear end walls;
   an electrical contact terminal extending through said front end wall into the internal chamber of said case;
   said case being positionable in a moving vehicle with said front end wall and contact terminal lying forwardly and with said case axis aligned with the vehicle axis;
   a heavy ball in said case chamber;
   a metal plunger leading through said case front end wall having a head adjacent said ball for being contacted by said ball; said head being adapted to contact said contact terminal to close the switch; and
   a spring in said case chamber surrounding said plunger and lying between said front end wall and said head on said plunger normally resiliently urging said head and ball away from said contact terminal to open electrical contact between said head and said contact terminal;
   said ball and plunger under deceleration forces moving said plunger head against said spring into electrical contact with said contact terminal to close an electrical circuit.

3. An inertia actuated normally open switch movable to a closed position by deceleration forces, comprising
   an electrically non-conductive case having first and second end walls and interconnecting walls defining an internal chamber;
   said case having a longitudinal axis lying between said end walls;
   an electrical contact terminal extending through said first end into the internal chamber of said case;
   said case being positionable in a moving vehicle with said first end and contact terminal lying forwardly and with said case axis aligned with the vehicle axis;
   a metal ball in said case chamber;
   a metal cage on and in contact with said ball;
   a spring in said case chamber surrounding said contact terminal and lying between said first wall and said cage normally resiliently urging said cage and ball away from said contact terminal to open electrical contact therebetween, and
   a metal bottom plate in said case chamber in electrical contact with said ball;
   said bottom plate and said terminal being connectable in an electrical circuit;
   said ball and cage under deceleration forces moving into electrical contact with said contact terminal to close an electric circuit by compressing said spring.

4. In a device as set forth in claim 3, said case having a bottom wall and a depressed shallow socket in one said case bottom wall adjacent said second end of said case for receiving said ball to hold said ball until deceleration forces build up sufficiently for said ball to move out of said socket and against said spring.

5. In a device as set forth in claim 3, said case having a bottom wall; said metal bottom plate being spaced from said second end of said case and elevated above said bottom wall of said case constituting a step for said ball to move upon deceleration forces building up sufficiently to cause said ball to move over said step against said spring.

References Cited
UNITED STATES PATENTS

| | | | |
|---|---|---|---|
| 2,244,417 | 6/1941 | Bacon | 73—514 X |
| 2,835,759 | 5/1958 | Waldow | 200—61.45 X |
| 2,894,088 | 7/1959 | Prather | 340—262 X |
| 2,921,999 | 1/1960 | Ziegler | 200—61.53 X |
| 2,997,557 | 8/1961 | Gillmor et al. | 200—61.53 X |
| 3,141,936 | 7/1964 | Boyle et al. | 200—61.53 |
| 3,218,870 | 11/1965 | Baker | 73—492 |
| 3,295,101 | 12/1966 | Ellis | 340—262 X |

JOHN W. CALDWELL, *Primary Examiner.*

D. L. TRAFTON, *Assistant Examiner.*